(12) United States Patent
Ohta

(10) Patent No.: US 6,222,674 B1
(45) Date of Patent: Apr. 24, 2001

(54) PROJECTIVE IMAGE DISPLAY APPARATUS

(75) Inventor: Takashi Ohta, Sakai (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/415,422

(22) Filed: Oct. 8, 1999

(30) Foreign Application Priority Data

Oct. 9, 1998 (JP) .................................................. 10-287718
Apr. 28, 1999 (JP) .................................................. 11-121452

(51) Int. Cl.[7] .......................... G02B 27/10; F21V 29/00; G03B 21/14; G03B 21/28
(52) U.S. Cl. ...................... 359/618; 359/62.1; 359/622; 362/268; 353/48; 353/94
(58) Field of Search ...................................... 359/618, 619, 359/621, 622, 623; 353/48, 94; 362/27, 209, 210, 268, 543, 544, 545

(56) References Cited

U.S. PATENT DOCUMENTS 3,513,306 * 5/1970 Vantine .................................. 362/235
5,649,753 * 7/1997 Masumoto ............................ 353/102
6,075,648 * 6/2000 Yamamoto et al. ................. 359/619
6,089,720 * 7/2000 Sawai ..................................... 353/98

FOREIGN PATENT DOCUMENTS

| 6-242397 | 9/1994 | (JP) . |
| 6-265887 | 9/1994 | (JP) . |
| 7-120753 | 5/1995 | (JP) . |
| 7-181392 | 7/1995 | (JP) . |
| 8-304739 | 11/1996 | (JP) . |
| 9-146064 | 6/1997 | (JP) . |

* cited by examiner

*Primary Examiner*—Ricky Mack
(74) *Attorney, Agent, or Firm*—Sidley & Austin

(57) ABSTRACT

A projective image display apparatus directed to effecting improved brightness of a displayed image for projection. The improved brightness is a consequence of harmonizing an intensity distribution of light from one or more light sources and converting light from the one or more light sources into linearly polarized light of one direction.

20 Claims, 9 Drawing Sheets

PROJECTIVE IMAGE DISPLAY APPARATUS

RELATED APPLICATION

This Application is based on applications Nos. 10-287718 and 11-121452 filed in Japan, the contents of which are hereby incorporated by reference.

FIELD OF THE INVENTION

The present invention relates to an image display apparatus, and more particularly, to a projective image display apparatus that modulates light with an image display panel such as a liquid crystal panel and projects the modulated light with a projecting optical system.

DESCRIPTION OF THE PRIOR ART

Among image display apparatuses is a projective image display apparatus that modulates light from a light source with a liquid crystal panel according to an image signal and projects the modulated light onto a screen to thereby display an image. The projective image display apparatus is used for presenting an image to a multiplicity of people at a time, and in recent years, has been used as a data projector and a television having a comparatively large screen.

Typically, in such a projective image display apparatus, a lamp is used as the light source, and a quadratic-surface reflector is disposed behind the lamp so that as much of the light emitted by the lamp as possible is used for image projection. FIGS. 13(a) and 13(b) show the intensity distribution of the light supplied to a liquid crystal panel and the range of the luminous flux used by the liquid crystal panel. In FIG. 13(b), LB represents the luminous flux, and LC represents the liquid crystal panel. The light intensity decreases from the center of the luminous flux, and the intensity is low in the vicinity of the center because of the shadow cast by the lamp itself. For this reason, the light intensity distribution, having a mountain shape with a concave portion at the top as shown in FIG. 13(a), is nonuniform.

When light of such an intensity distribution is used for projection, the brightness of the displayed image is nonuniform. To prevent the peripheral part of the displayed image from being dark, it is necessary to use only the central part as shown in FIG. 13(b) and the light of the peripheral part is wasted. Even when only the central part is used, the intensity distribution within the range is still nonuniform, so that the brightness of the displayed image is nonuniform.

A way to harmonize the intensity distribution of the light directed to the liquid crystal panel is to dispose an integrator, comprising a first lens array, a second lens array and a superimposing lens, between the light source and the liquid crystal panel. By temporarily imaging light from a light source reflected at the reflector with the cells of the first lens array on the corresponding cells of the second lens array, a secondary light source of a surface form in which light source images are two-dimensionally arranged is formed on the second lens array. By directing light from each part of the secondary light source to the entire liquid crystal panel with the superimposing lens, light intensity distribution is harmonized and thus uniform. Consequently, images without any brightness nonuniformness can be displayed, and the low-intensity light of the peripheral part is also effectively used, so that brighter images can be displayed.

A liquid crystal panel modulates polarized light of a predetermined oscillation direction. The polarized component of an oscillation direction vertical to the predetermined oscillation direction is absorbed by a polarizing plate incorporated in the liquid crystal panel or disposed separately from the liquid crystal panel. Consequently, half of the light of a disordered oscillation direction is abandoned without being used for projection.

To improve light use efficiency by solving this problem, Japanese Laid-open Patent Applications Nos. 8-304739 and 9-146064 propose to perform polarization conversion by use of a polarization beam splitter (PBS) array or a PBS prism for separating two linearly polarized light beams whose oscillation directions are vertical to each other. By allowing one of the linearly polarized light beams separated by the PBS to pass through a half wave plate, the oscillation direction thereof can be made to coincide with that of the other linearly polarized light beam, so that the light from the light source having a disordered oscillation direction can all be used for image projection.

Japanese Laid-open Patent Application No. 6-242397 discloses a projective image display apparatus in which two light sources are provided, and the light beams from the light sources are synthesized and directed to the liquid crystal panel to thereby increase the brightness of the displayed images. In the apparatus of this prior art, the light beams from the light sources are converged at condensation positions close to each other, the converged two light beams are reflected at a mirror in the same direction as divergent luminous fluxes whose optical axes are parallel to each other, and the divergent luminous fluxes are converted into parallel luminous fluxes by a collimator lens and directed to the liquid crystal panel. The light beams from the two light sources are synthesized by being converted into divergent luminous fluxes whose optical axes are close to each other.

The harmonization of the intensity distribution of the light from the light source, the conversion of the light from the light source into linearly polarized light of one direction by polarization conversion, and the provision of two light sources are all effective in improving the brightness of displayed images. By combining these three, a projective image display apparatus will be realized that displays bright images and is capable of using the light from the light source without waste. However, such a projective image display apparatus has not been proposed.

Since three techniques are based on different principles, it is not easy to appropriately combine them all. For example, the integrator for harmonizing the light intensity distribution and the PBS for performing polarization conversion must not adversely affect each other, and how these elements should be disposed cannot be found in the known art. In the art of Japanese Laid-open Patent Application No. 6-242397 using two light sources, the closer to each other the condensation positions of the two light beams from the two light sources are, the greater the quantity of unreflected light at the mirror, so that it is necessary to give special consideration to the setting of the condensation positions when the provision of the two light sources is combined with the integrator for harmonizing the light intensity distribution for uniformity or with the PBS for performing polarization conversion.

SUMMARY OF THE INVENTION

An object of the present invention is to provide an improved projective image display apparatus.

Another object of the present invention is to provide a projective image display apparatus capable of displaying images of high brightness by use of two light sources.

Yet another object of the present invention is to provide a projective image display apparatus using the light beams from the light sources without waste.

The above-mentioned objects are achieved by a projective image display apparatus having the following structure:

a projective image display apparatus that modulates light with a display panel and projects modulated light with a projecting lens to display an image is provided with:

a first light source;

a second light source;

a first condensing optical system converging a light beam from the first light source at a first condensation position;

a second condensing optical system converging a light beam from the second light source at a second condensation position close to the first condensation position;

a reflecting optical system having a reflecting surface reflecting at least one of the light beams from the first and the second light sources at the corresponding condensation position, and deflecting the light beams from the first and the second light sources so that optical axes thereof are parallel or close to parallel;

a collimator lens converting into parallel luminous fluxes the light beam from the first light source converted into a divergent luminous flux by passing through the first condensation position and the light beam from the second light source converted into a divergent luminous flux by passing through the second condensation position;

an integrator optical system having a first lens array comprising lens cells arranged in a two-dimensional array and a second lens array comprising lens cells arranged in a two-dimensional array in correspondence with the lens cells of the first lens array, imaging the parallel luminous fluxes from the collimator lens on the lens cells of the second lens array with the corresponding lens cells of the first lens array so as to be separated, and illuminating the entire surface of the display panel from the lens cells of the second lens array; and a polarization conversion optical system separating, as two linearly polarized light beams of different oscillation directions, the light beams having passed through the lens cells of the first lens array in a direction vertical to the direction of the separation by the first lens array, and converting the oscillation direction of one of the two separated linearly polarized light beams so as to coincide with the oscillation direction of the other linearly polarized light beam.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENT

Figure 1:
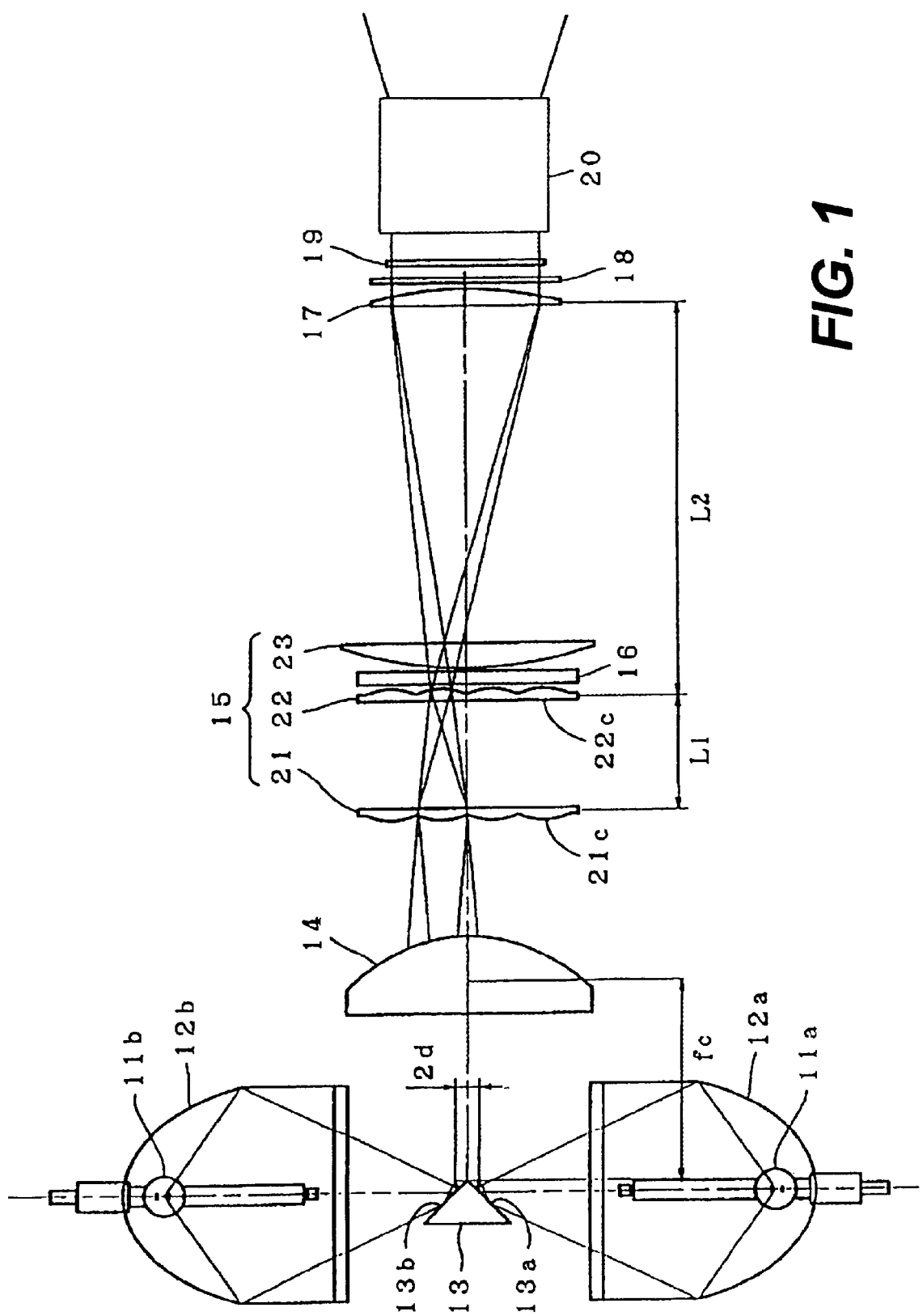
FIG. 1 shows the general structure of optical systems of a projective image display apparatus according to a first embodiment.

Preferred embodiments of a projective image display apparatus (hereinafter, sometimes referred to as projective display apparatus) will be described with reference to the drawings. FIG. 1 shows the structure of optical systems of a projective image display apparatus 1 according to a first embodiment. The projective display apparatus 1 comprises a first light source 11a, a second light source 11b, a first condensing optical system 12a, a second condensing optical system 12b, a reflecting optical system 13, a collimator lens 14, an integrator optical system 15, a polarization conversion optical system 16, a field lens 17, a polarizing plate 18, a liquid crystal panel 19 and a projecting lens 20.

In the projective display apparatus 1, light beams emitted by the light sources 11a and 11b are directed to the liquid crystal panel 19 by way of the condensing optical systems 12a and 12b, the reflecting optical system 13, the collimator lens 14, the integrator optical system 15, the polarization conversion optical system 16, the field lens 17 and the polarizing plate 18. Light beams are modulated by the liquid crystal panel 19 according to image signals, and the modulated light beams are projected onto a non-illustrated screen by the projecting lens 20 to thereby display an image on the screen. The liquid crystal panel 19 is driven by a non-illustrated drive circuit. The drive circuit is supplied with image signals such as television signals or signals produced by a personal computer.

The light sources 11a and 11b are arc discharge lamps such as metal halide lamps. The condensing optical systems 12a and 12b are reflectors having a configuration in which a quadratic surface formed by rotating an ellipse about the major axis thereof is cut in a direction vertical to the major axis. The inner surfaces of the optical systems 12a and 12b are reflecting surfaces. The light sources 11a and 11b have the same performance, and the condensing optical systems 12a and 12b have the same performance. The first light source 11a and the second light source 11b are disposed so that the light emitting portions (arcs) thereof are situated at the first focal points of the first condensing optical system 12a and the second condensing optical system 12b, respectively. The condensing optical system 12a and the condensing optical system 12b are disposed opposite to each other so that the major axes thereof coincide with each other and the second focal points thereof are close to each other.

The light beams emitted by the light sources 11a and 11b situated at the first focal points are reflected at the light condensing optical systems 12a and 12b and converged at the second focal points of the condensing optical systems 12a and 12b by a characteristic of the elliptical surface. However, since the light emitting portions of the light sources 11a and 11b have a certain size, the light beams from the condensing optical systems 12a and 12b are not strictly points at the condensation positions. Rather, the cross sections of the luminous fluxes at the condensation positions are small-diameter circles.

The reflecting optical system 13 has, as reflecting surfaces, orthogonal surfaces 13a and 13b of a triangular prism whose cross section is a right-angled isosceles triangle. Moreover, the reflecting optical system 13 is disposed so that the second focal points of the condensing optical systems 12a and 12b are situated above or close to the reflecting surfaces 13a and 13b and that the hypotenuse of the cross section is parallel to the major axes of the condensing optical systems 12a and 12b. The light beams from the light sources 11a and 11b reflected at the condensing optical systems 12a and 12b and converged are reflected at the reflecting surfaces 13a and 13b into conical divergent luminous fluxes advancing in the same direction. At this time, the optical axes of the divergent luminous fluxes (the central axes of the luminous fluxes) are parallel to each other and separated by the distance between the points of intersection of the major axes of the condensing optical systems 12a and 12b and the reflecting surfaces 13a and 13b because of the positional relationship between the condensing optical systems 12a and 12b and the reflecting optical system 13.

The collimator lens 14 is disposed so that (i) the optical axis thereof is situated at the midpoint between the optical axes of the two divergent luminous fluxes from the reflecting optical system 13 and (ii) the focal plane thereof includes the condensation positions of the light beams from the light sources 11a and 11b, that is, the second focal points of the condensing optical systems 12a and 12b. Consequently, the light beams from the first and the second light sources 11a and 11b reflected at the reflecting optical system 13 into divergent luminous fluxes are both converted into parallel luminous fluxes. The optical axes of the light beams from the first and the second light sources 11a and 11b reflected at the reflecting optical system 13 are close to each other, and the light beams from the first and the second light sources 11a and 11b converted into parallel luminous fluxes overlap in most part.

The integrator optical system 15 has a first lens array 21, a second lens array 22, and a superimposing lens 23. The first lens array 21 comprises rectangular lens cells 21c substantially analogous to the liquid crystal panel 19. The lens cells 21c are arranged in a two-dimensional array. Specifically, the lens cells 21c are arranged in four rows in the direction of the long sides and in five rows in the direction of the short sides. The long sides of the lens cells 21c are parallel to the major axes of the condensing optical systems 12a and 12b, and consequently, coincide with the direction of separation of the optical axes of the light beams reflected at the reflecting optical system 13. The long sides of the liquid crystal panel 19 are also parallel to the major axes of the condensing optical systems 12a and 12b.

The second lens array 22 comprises rectangular lens cells 22c having the same size as the lens cells 21c of the first lens cells 21c. The lens cells 22c are arranged in a two-dimensional array. The number and the arrangement direction of the lens cells 22c of the second lens array 22 are the same as those of the first lens array 21.

The lens arrays 21 and 22 are disposed vertically to the optical axis of the collimator lens 14 so that the optical axis of the collimator lens 14 passes through the centers of the lens arrays 21 and 22. Moreover, the lens arrays 21 and 22 are separated from each other by the focal length of the lens cells 21c of the first lens array 21. The lens cells 21c of the first lens array 21 and the lens cells 22c of the second lens array 22 are in one-to-one correspondence. The optical axes of corresponding lens cells 21c and 22c coincide with each other.

The parallel luminous fluxes incident on the lens cells 21c of the first lens array 21 are imaged on the corresponding lens cells 22c of the second lens array 22 to form images of the light sources 11a and 11b. At this time, since the optical axes of the light beams from the light sources 11a and 11b reflected at the reflecting optical system 13 are separated (although being close to each other) in the direction of the long sides of the lens cells 21c, the image of the first light source 11a and the image of the second light source 11b on each lens cell 22c of the second lens array 22 are separated in the direction of the long sides of the lens cells 21c.

Figure 2:
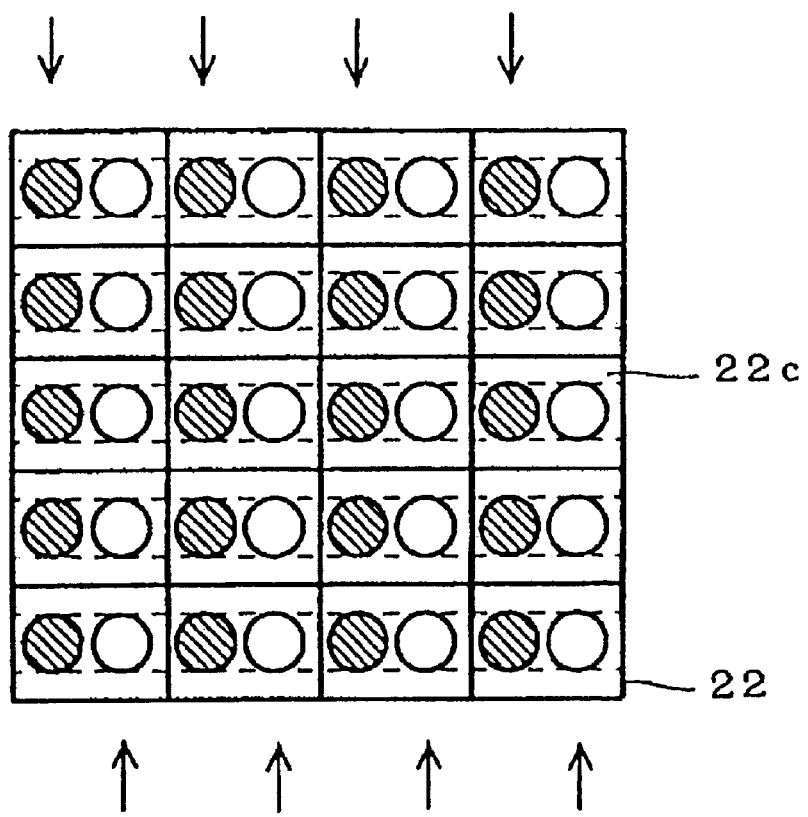
FIG. 2 shows an example of light source images formed on a second lens array of the projective image display apparatus according to the first embodiment.

FIG. 2 shows an example of the light source images formed on the second lens array 22. In FIG. 2, the horizontal direction is the direction of the long sides of the lens cells 21c and 22c. The images in the columns indicated with the down-pointing arrows are the images of the first light source 11a. The images in the columns indicated with the up-pointing arrows are the images of the second light source 11b. The images of the light sources 11a and 11b are alternately formed in the direction of the long sides of the lens cells 21c.

Thus, on the second lens array 22, light source images, being twice as many as the lens cells 21c of the first lens array 21, are two-dimensionally formed. The cluster of these images serves as a surface-formed secondary light source for image projection, and the light thereof passes through the polarization conversion optical system 16 and is directed to the liquid crystal panel 19 by the superimposing lens 23.

The superimposing lens 23 directs the light having passed through the second lens array 22 to the entire surface of the liquid crystal panel 19 from all parts of the second lens array 22. Consequently, to all parts of the liquid crystal panel 19, the light beams having passed through ones of the lens cells 22c that are disposed in the central part and the light beams having passed through ones of the lens cells 22c that are disposed in the peripheral part are supplied, and the light beam from the first light source 11a and the light beam from the second light source 11b are supplied.

Consequently, light of uniform intensity is incident on the liquid crystal panel 19, so that the brightness of the image projected by the projecting lens 20 is uniform. Moreover, the peripheral parts of the light beams from the first and the second light sources 11a and 11b are also incident on the liquid crystal panel 19, so that the light use efficiency in image projection improves.

While the second lens array 22 and the superimposing lens 23 are separately provided in this embodiment, the superimposing lens 23 can be omitted by providing the second lens array 22 with the function of the superimposing lens 23.

Figure 3:
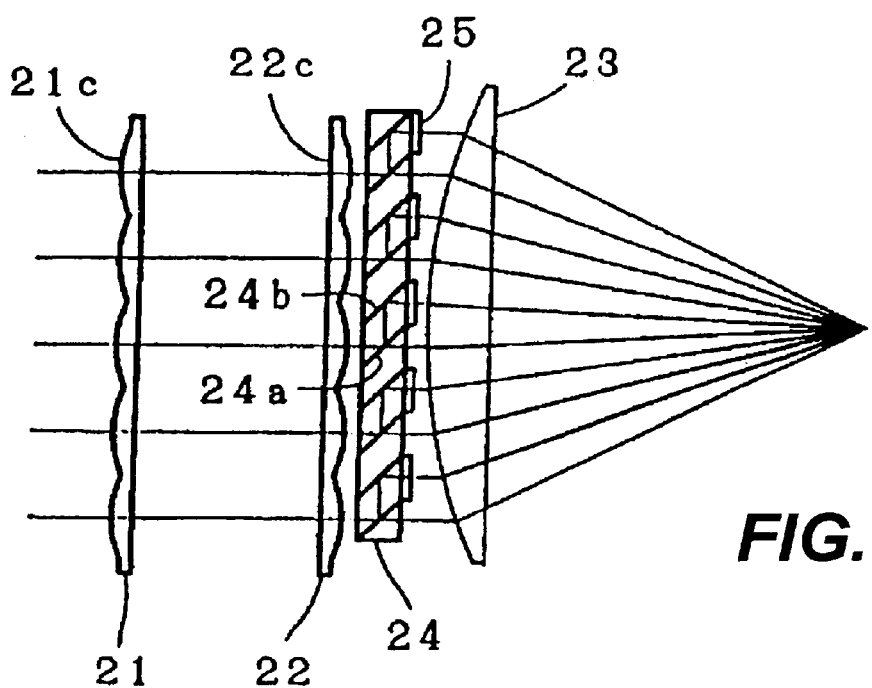
FIG. 3 shows a polarization conversion optical system and an integrator optical system of the projective image display apparatus according to the first embodiment viewed in the direction of the major axes of condensing optical systems.

The polarization conversion optical system 16 is disposed between the second lens array 22 and the superimposing lens 23 of the integrator optical system 15. The polarization conversion optical system 16 separates light of a disordered oscillation direction transmitted by the lens array 22 into a linearly polarized light beam of a predetermined oscillation direction and a linearly polarized light beam of an oscillation direction vertical to the predetermined oscillation direction, and converts the oscillation direction of one light beam so as to coincide with that of the other light beam, thereby converting the light supplied to the liquid crystal panel 19 into linearly polarized light of one direction. FIG. 3 shows the polarization conversion optical system 16 and the integrator optical system 15 viewed from the direction of the major axes of the condensing optical systems 12a and 12b.

The polarization conversion optical system 16 comprises a PBS array plate 24 and half-wave plates 25. In the PBS array plate 24, pairs of reflecting films 24a and 24b are formed to reflect s-polarized light and to transmit p-polarized light. The reflecting films 24a and 24b have a strip form, which is elongated in the direction of the long sides of the lens cells 21c and 22c and has a length that extends to both ends of the lens arrays 21 and 22. Five pairs of reflecting films 24a and 24b are formed in the direction of the short sides of the lens cells 21c and 22c. The number is the same as the number of rows of the lens cells 21c and 22c in that direction.

The reflecting films 24a and 24b are parallel to each other and inclined at 45 degrees with respect to the optical axes of the lens cells 21c and 22c. The widths of the reflecting films 24a and 24b are set to $1/\sqrt{2}$ of the short sides of the lens cells 21c and 22c so as to correspond to ½ of the lens cells 21c and 22c. Moreover, the reflecting films 24a and 24b are disposed at even intervals of ½ of the short sides of the lens cells 21c and 22c so that the optical axes of the lens cells 21c and 22c pass the center of one reflecting film 24a of each pair.

The half-wave plates 25 also have a strip form elongated in the direction of the long sides of the lens cells 21c and 22c and having a length that extends to both ends of the lens arrays 21 and 22. The widths of the half-wave plates 25 are ½ of the short sides of the lens cells 21c and 22c. The half-wave plates 25 are evenly spaced on the superimposing lens 23 side surface of the PBS array plate 24 so as to be opposed to the reflecting films 24b.

Light beams, once through the central parts of the lens cells 22c of the second lens array 22, are incident on the reflective films 24a. Of the light beams, p-polarized light is transmitted by the reflecting films 24a and directly passed to the superimposing lens 23. S-polarized light is reflected at the reflecting films 24a, again reflected at the adjoining reflecting films 24b, incident on the half-wave plates 25, converted into p-polarized light by being transmitted by the half-wave plates 25, and then, passed to the superimposing lens 23. Consequently, the light beams having passed through the central parts of the lens cells 22c are all p-polarized light when reaching the superimposing lens 23.

Light beams, once through the peripheral parts of the lens cells 22c are incident on the reflecting films 24b. Of the light beams, p-polarized light is transmitted by the reflecting films 24b, incident on the half-wave plates 25, converted into s-polarized light, and passed to the superimposing lens 23. S-polarized light is reflected at the reflecting films 24b, again reflected at the adjoining reflecting films 24a, and passed to the superimposing lens 23 while remaining s-polarized light. Consequently, light beams passing through the peripheral parts of the lens cells 22c are all s-polarized light when reaching the superimposing lens 23. However, since the lens array 21 is set so that the quantity of the light passing through the peripheral parts of the lens cells 22c is small, as mentioned later, most of the light beams transmitted by the lens array 22 are p-polarized light.

The field lens 17 converts light from the superimposing lens 23 of the integrator optical system 15 into light substantially vertical relative to the liquid crystal panel 19. The liquid crystal panel 19 modulates p-polarized light and for this reason, the polarizing plate 18 is set so as to transmit p-polarized light. The projecting lens 20 projects the light modulated by the liquid crystal panel 19 onto the screen to thereby display an image on the screen. The projecting lens 20 has a focusing mechanism and a zooming mechanism, and the projection distance and the projection magnification thereof are variable. Since the field lens 17 converts the light into light substantially vertical to the liquid crystal panel 19, the loss of light due to the angle dependency of the transmission characteristic of the liquid crystal panel 19 is prevented, so that substantially all the light is directed to the projecting lens 20.

Since the light beams having passed through the central parts of the lens cells 22c are converted so as to be all p-polarized light and the polarizing plate 18 transmits p-polarized light, the light beams having passed through the central parts of the lens cells 22c are all supplied to the liquid crystal panel 19 and used for projection. The light beams having passed through the peripheral parts of the lens cells 22c cannot be transmitted by the polarizing plate 18 since they are all s-polarized light.

If the light from the lens cells 21c is evenly incident on the entire surface of each of the lens cells 22c and transmitted by the lens cells 22c as it is, one half of the light directed to the polarizing plate 18 is p-polarized light and the other half is s-polarized light. Then, it is meaningless to provide the projective display apparatus 1 with the polarization conversion optical system 16. For this reason, the integrator optical system 15 is set so that as much of the light from the lens cells 21 as possible falls within a range ½ of the central parts of the lens cells 22c in the short sides.

Hereinafter, setting conditions of the optical systems of the projective display apparatus 1 for displaying bright images by using as much of the light beams from the light sources 11a and 11b as possible for projection will be described. Parameters of the optical systems associated therewith are defined as follows:

CH is the length of the short sides of the lens cells 21c;
CW is the length of the long sides of the lens cells 21c;
PH is the length of the short sides of the liquid crystal panel 19;
PW is the length of the long sides of the liquid crystal panel 19;
L1 is the optical path length between the first lens array 21 and the second lens array 22;
L2 is the optical path length between the second lens array 22 and the field lens 17;
fc is the focal length of the collimator lens 14;
d is ½ of the distance between the first condensation position of the first condensing optical system 12a and the second condensation position of the second condensing optical system 12b; and
M is ½ of the luminous flux diameters, at the first and the second condensation positions, of the light beam from the first light source 11a and the light beam from the second light source 11b.

The optical path length is the distance between optical elements when the medium at the optical path is air. In the projective display apparatus 1 of this embodiment, the optical path length L1 equals the distance between the first lens array 21 and the second lens array 22, and the optical path length L2 is longer than the distance between the second lens array 22 and the field lens 17 because of the interposition of the polarization conversion optical system 16.

First, it is necessary that the light incident on the first lens array 21 of the integrator optical system 15 be all directed to the liquid crystal panel 19. Moreover, it is necessary that the light be directed to the entire surface of the liquid crystal panel 19 so that there is no part where no light is incident. As mentioned previously, the first lens array 21 and the liquid crystal panel 19 are analogous to each other and the long sides and the short sides thereof correspond to each other. Therefore, in order that the light of the lens array 21 is all directed to the liquid crystal panel 19 and directed to the entire surface of the liquid crystal panel 19, the following condition is indispensable:

$$PH/CH \approx PW/CW = L2/L1 \qquad (1)$$

Then, it is necessary that as much of the light beams from the light sources 11a and 11b as possible be incident on the first lens array 21. To realize this, it is desirable that the light beams from the light sources 11a and 11b, which are converged by the condensing optical systems 12a and 12b, be all incident on the reflecting surfaces 13a and 13b of the reflecting optical system 13. This is achieved by setting a distance between the two intersections of the condensing optical systems 12a and 12b and the reflecting surfaces 13a and 13b, that is, the distance between the first and the second condensation positions so as to be equal to or larger than the diameters of the luminous fluxes at the condensation positions. Therefore, $$M \leq d \qquad (2)$$

If the first and the second condensation positions coincide with each other so that d=0, half of each of the light beams from the light sources 11a and 11b passes by the side of the reflecting optical system 13, so that it is meaningless to provide two light sources.

The liquid crystal panel 19 is supplied with the light transmitted by the second lens array 22. Therefore, it is necessary that as much as possible of the light incident on the lens cells 21c of the first lens array 21 be imaged in the corresponding lens cells 22c of the second lens array 22.

Figure 4:
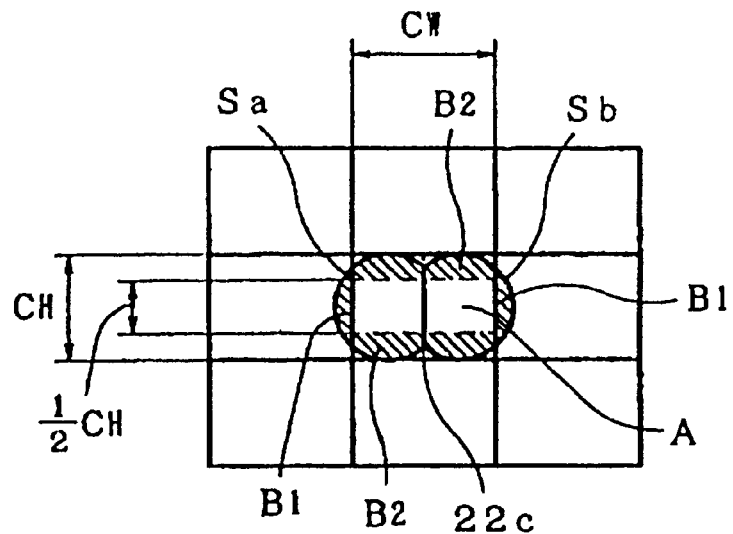
FIG. 4 shows an example of light source images on one lens cell of the second lens array of the projective image display apparatus according to the first embodiment.

FIG. 4 shows an example of the light source images on one lens cell 22c of the second lens array 22. An image Sa of the first light source 11a and an image Sb of the second light source 11b are formed symmetrically in the direction of the long sides of the lens cell 22c. The line that is in the center, relative to the long sides and parallel to the short sides, that is, the axis of symmetry of the light source images Sa and Sb, corresponds to the line of intersection of the reflecting surface 13a and the reflecting surface 13b of the reflecting optical system 13. As described below, the part of the light source images Sa and Sb whose light is used for image projection is an unhatched rectangular part A in the central part in the short sides of the lens cell 22c. The light of hatched parts B1 and B2 around the part A cannot be used for image projection.

Since the focal length of the collimator lens 14 is fc and the focal length of the lens cells 21c of the first lens array 21 is L1, the enlargement magnification at the second lens array 22 to the first and the second condensation positions is L1/fc. Therefore, the distances from the center, relative to the long sides of the lens array 22c, to the centers of the light source images Sa and Sb are d·L1/Fc and the radii of the light source images Sa and Sb are M·L1/fc.

In the example of FIG. 4, the expression (2) is not satisfied, thus part of the light from the light sources 11a and 11b is not reflected at the reflecting optical system 13, and part of each of the light source images Sa and Sb, which are intrinsically circular, is missing at the axis of symmetry. Moreover, in this example, another part B1 of each of the light source images Sa and Sb is formed on the adjoining lens cell beyond the short side. The light of the part B1 is incident on the superimposing lens 23 at an inappropriate angle, so that it does not exit toward the liquid crystal panel 19.

To prevent the loss of light caused by the formation of the light source images Sa and Sb on the adjoining cells (i.e., beyond the short sides of the lens cell 22c), it is necessary that the following condition hold:

$$d \cdot L1/fc + M \cdot L1/fc < (\tfrac{1}{2}) \cdot CW \qquad (3)$$

As described above, at the polarization conversion optical system 16, the light of the part A within the range of the length ½ of the short sides, which part is in the center of the lens cell 22c, is converted so as to be all desired p-polarized light, and the light of the part B2 outside the range is opposite s-polarized light. Therefore, in order to convert all the light into the desired p-polarized light and use it for image projection, the diameters of the light source images Sa and Sb on the lens cell 22c must be half the length of the short sides of the lens cell 22c or smaller. Expressing this with the radii of the light source images Sa and Sb:

$$M \cdot L1/fc \leq (\tfrac{1}{4}) \cdot CH \qquad (4)$$

The polarization conversion efficiency at this time is a theoretical maximum value 2.

When the expressions (1) to (4) are all satisfied, the light beams emitted by the two light sources 11a and 11b and converged by the condensing optical systems 12a and 12b are all directed to the integrator optical system 15, and supplied from the integrator optical system 15 to the liquid crystal panel 19 without any loss with the s-polarized light being all converted into p-polarized light by the polarization conversion optical system 16. The light source images in FIG. 2 show this ideal condition. At this time, the quantity of the light used for image projection is four times that in the case where light from one light source is condensed and directed to the liquid crystal panel as it is. In addition, since the intensity distribution of the light is harmonized by the integrator optical system 15, it is unnecessary to discard the peripheral part of the luminous flux as shown in FIG. 13(b), so that the light use efficiency further improves.

However, the expressions (2) to (4) include the luminous flux radius M of the light beams from the light sources 11a and 11b at the first and the second condensation positions. Since the light emitting portions of the light sources 11a and 11b have a certain size, the reduction of the luminous flux radius M is limited. Moreover, since the lamps serving as the light sources 11a and 11b are consumables, it is necessary to replace them. Replacement lamps of various standards are available, and the light emission amount and the size of the light emitting portion vary among the standards. Application of the strict limitations of the expressions (2) to (4) to the luminous flux radius M is undesirable in practical use because the replacement lamps that can be used in the projective display apparatus 1 are limited.

If the expression (1) is strictly satisfied, when a displacement is caused between the relative positions of the integrator optical system 15 and the liquid crystal panel 19, there is a part where no light is incident in the peripheral part of the liquid crystal panel 19. When this happens, the peripheral part of the displayed image is missing.

Thus, satisfaction of the expressions (1) to (4) which are ideal conditions with respect to the brightness of the displayed image is not always advisable in other points. Therefore, the projective display apparatus 1 satisfies the following expressions (5), (6) and (7) of less strict limitations while considering the meanings of the expressions (1) to (4):

$$PH/CH \approx PW/CW \leq L2/L1 \quad (5)$$

$$(\tfrac{1}{8}) \cdot CW \leq d \cdot L1/fc \leq (\tfrac{3}{8}) \cdot CW \quad (6)$$

$$M \cdot L1/fc \leq (\tfrac{1}{2}) \cdot CH \quad (7)$$

The expression (5) ensures that the liquid crystal panel 19 falls within the luminous flux of the integrator optical system 15. The expression (6) permits the light source images Sa and Sb on the lens cells 22c to slightly extend into the adjoining cells beyond the short sides. When $d \cdot L1/fc = (\tfrac{1}{4}) \cdot CW$, the centers of the first and the second light source images Sa and Sb on the lens cells 22c of the second lens array 22 are separated by ½ of the length of the long sides of the lens cells 22c, and the areas of the light source images Sa and Sb that lie on the lens cells 22c are maximum irrespective of the sizes of the light source images Sa and Sb.

The expression (7) permits the light source images Sa and Sb on the lens cells 22c to extend outside the range A, such being ½ of the short sides in the central part of the lens cells 22c. Even when the equal sign holds, only the circumferences of the outer rims of the light source images Sa and Sb are in contact with the long sides of the lens cells 22c, and of the light source images Sa and Sb, the parts that fall within the range A, such being ½ of the short sides in the central part of the lens cell 22c, is larger than the parts outside the range A. Consequently, the polarization conversion efficiency exceeds 1 and the effect of polarization conversion is ensured.

Figure 12:
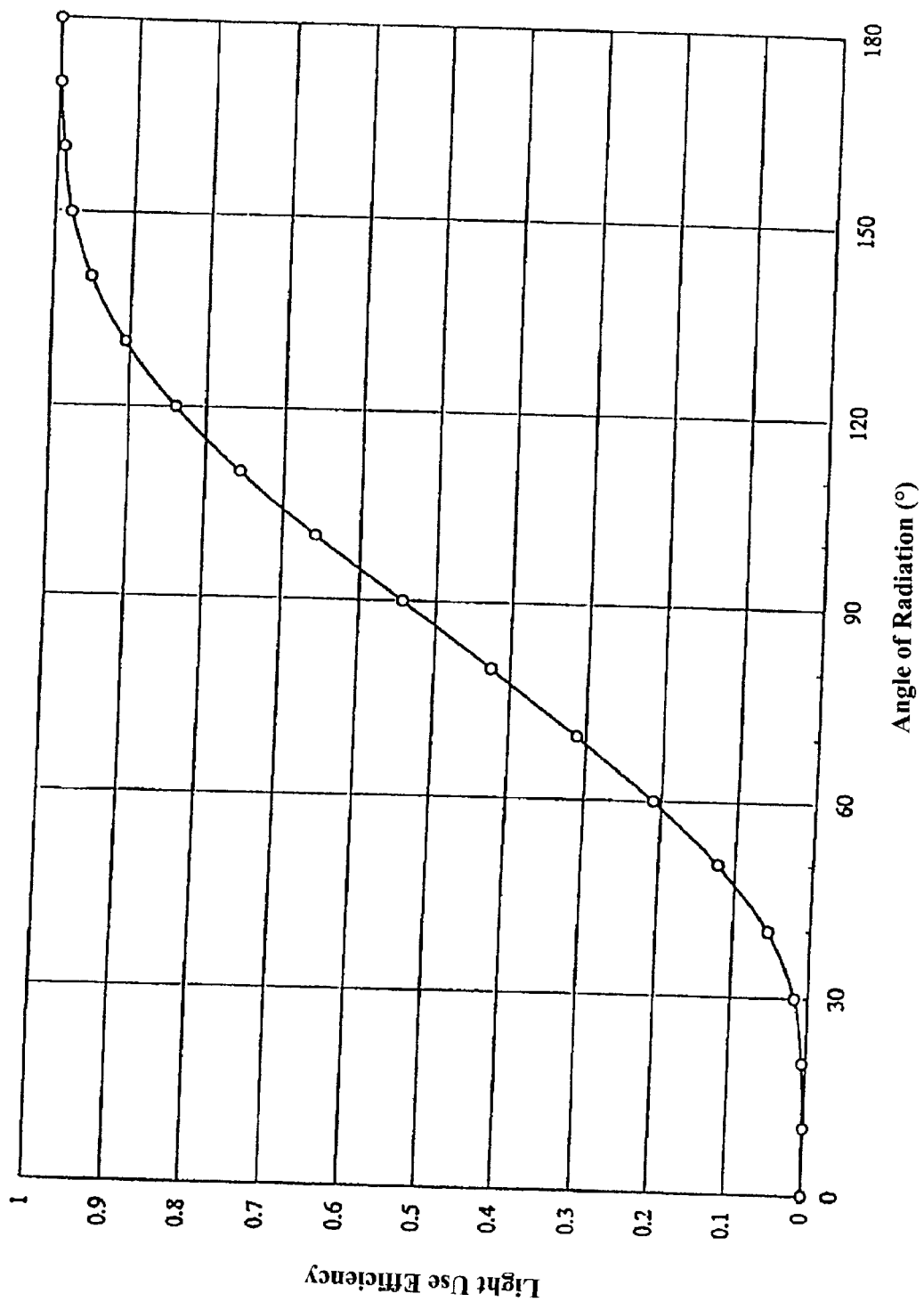
FIG. 12 shows light use efficiency of an elliptical reflector.

How much of the light of the light sources 11a and 11b is reflected at the condensing optical systems 12a and 12b is also relevant to light use efficiency. FIG. 12 shows the light use efficiency of an elliptical reflector like the condensing optical systems 12a and 12b of the projective display apparatus 1. In FIG. 12, the horizontal axis represents an angle of radiation defined by the angle between the major axis and a straight line connecting the first focal point (i.e., where the light source is disposed) and a point on the circumference (the first focal point side intersection of the major axis and the circumference is 0), and the vertical axis represents the ratio of light reflected at the reflector and used to all the light emitted by the light sources. Although the quantity of the light reflected at the reflector increases as the angle of radiation increases, since too large an angle of radiation decreases the condensation accuracy because the light sources themselves have a certain size, it is desirable that the angle of radiation be approximately 110 to 130 degrees, where approximately 75% or more of the light is reflected and condensation is accurately performed.

While elliptical reflectors are used as the condensing optical systems 12a and 12b in the projective display apparatus 1, the condensing optical systems are not limited thereto. For example, a parabolic reflector and a condenser lens may be used so that the light of the light source disposed at the focal point of the reflector is converted into a parallel luminous flux by the reflector, and the parallel luminous flux is converged by the condenser lens.

Figure 5:
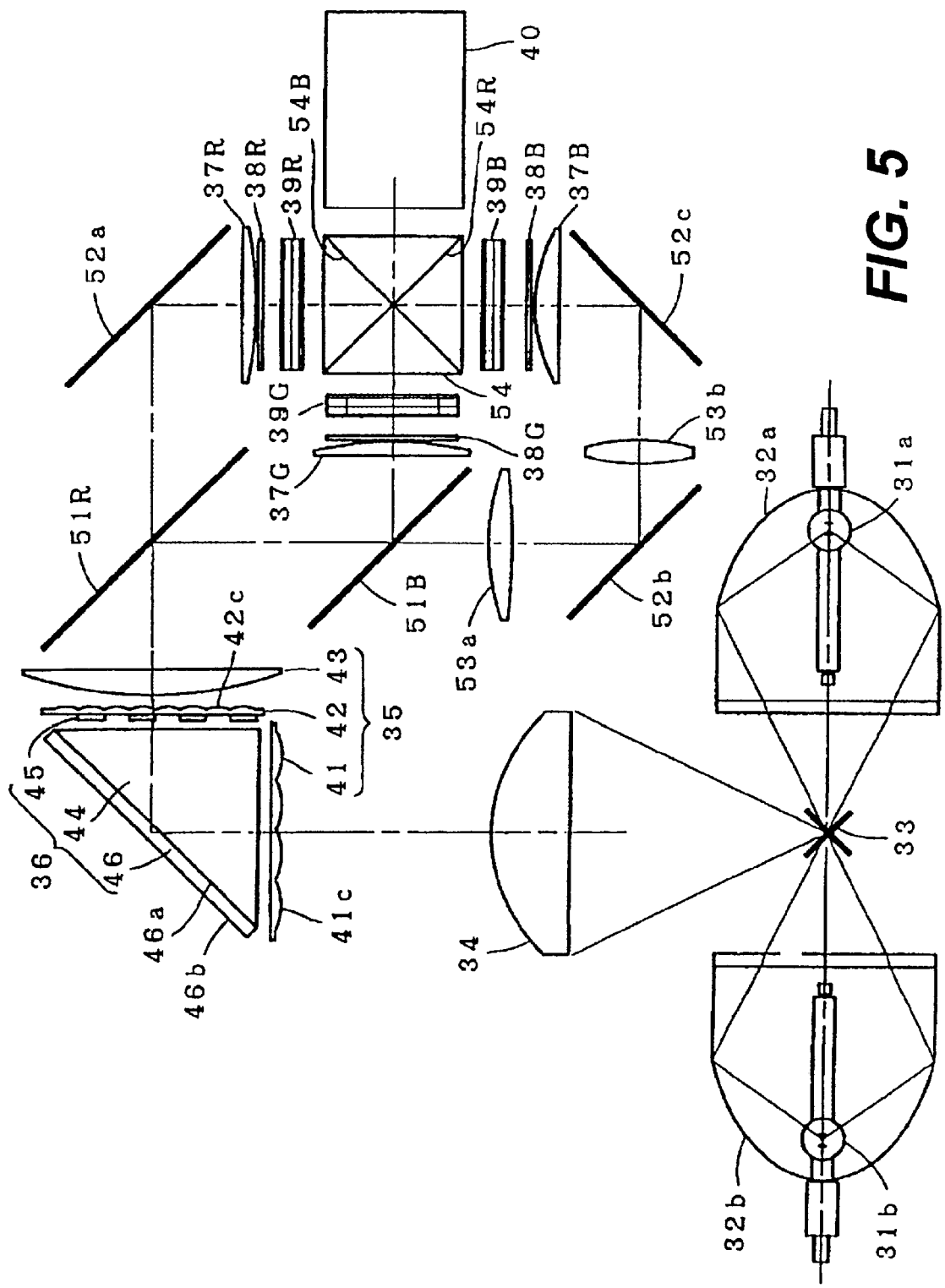
FIG. 5 shows the general structure of optical systems of a projective image display apparatus according to a second embodiment.

FIG. 5 shows the structure of optical systems of a projective image display apparatus 2 according to a second embodiment. The projective display apparatus 2 comprises a first light source 31a, a second light source 31b, a first condensing optical system 32a, a second condensing optical system 32b, a reflecting optical system 33, a collimator lens 34, an integrator optical system 35, a polarization conversion optical system 36, three liquid crystal panels 39R, 39G and 39B, and a projecting lens 40.

In the projective display apparatus 2, light beams from the light sources 31a and 31b are separated into light beams of red (R), green (G) and blue (B) and directed to the liquid crystal panels 39R, 39G and 39B. The light beams of the three colors are individually modulated according to the image signals of R, G and B, and the modulated light beams are synthesized and projected to display a color image on a screen.

The projective display apparatus 2 has two dichroic mirrors 51R and 51B, three totally reflecting mirrors 52a, 52b and 52c and two relay lenses 53a and 53b for color-separating and directing the light to the liquid crystal panels 39R, 39G and 39B. The apparatus 2 further has a cross dichroic prism 54 for synthesizing the modulated light and directing the synthesized light to the projecting lens 40. Moreover, field lenses 37R, 37G and 37B and polarizing plates 38R, 38G and 38B are provided for the liquid crystal panels 39R, 39G and 39B, respectively.

The light sources 31a and 31b and the condensing optical systems 32a and 32b are the same as those of the projective display apparatus 1 of the first embodiment. The light sources 31a and 31b are disposed so that the light emitting portions thereof are situated at the first focal points of the condensing optical systems 32a and 32b. The condensing optical systems 32a and 32b are disposed being slightly shifted, in a direction vertical to the major axes thereof, from a condition where the major axes thereof coincide with each other and the second focal points thereof coincide with each other.

Figure 6:
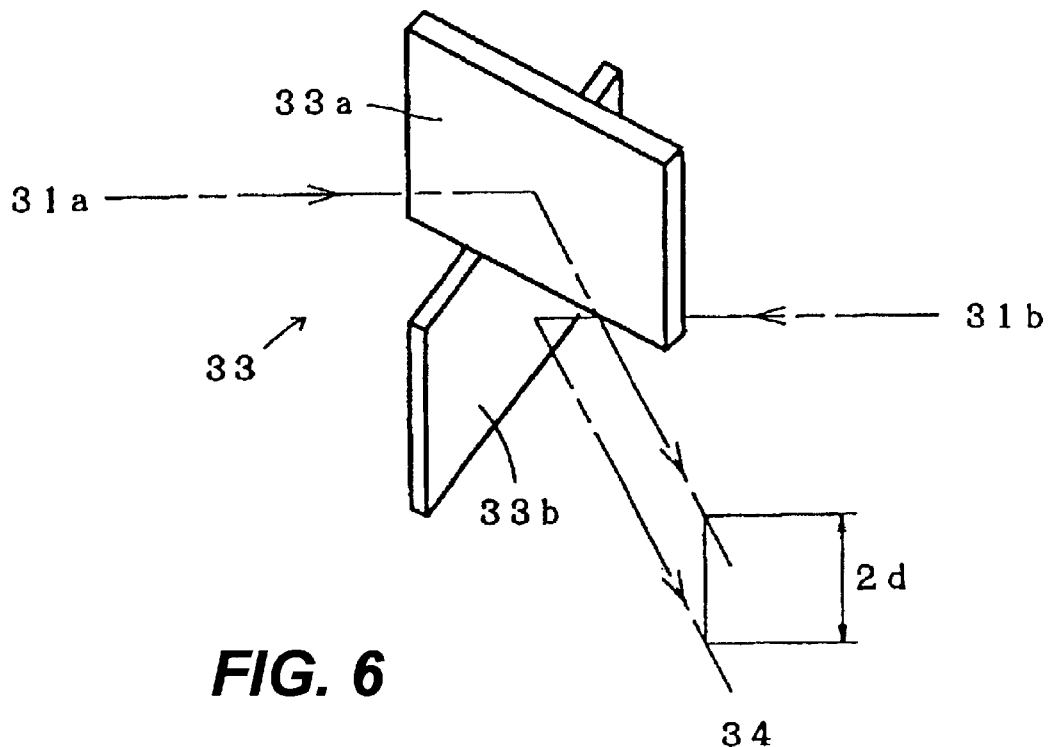
FIG. 6 is a perspective view of a reflecting optical system of the projective image display apparatus according to the second embodiment.

FIG. 6 shows the reflecting optical system 33 viewed from an oblique direction. The reflecting optical system 33 comprises two flat totally reflecting mirrors cemented in the vicinity of the centers of side surfaces so that reflecting surfaces 33a and 33b are orthogonal to each other. The reflecting optical system 33 is disposed so that the second focal points of the condensing optical systems 32a and 32b are situated on the reflecting surfaces 33a and 33b, respectively, and that the reflecting surfaces 33a and 33b are inclined at 45 degrees with respect to the major axes of the condensing optical systems 32a and 32b. The light beams from the light sources 31a and 31b, which are reflected at the condensing optical systems 32a and 32b and converged, are reflected at the reflecting surfaces 33a and 33b into conical divergent luminous fluxes advancing in the same direction. At this time, the optical axes of the divergent luminous fluxes are parallel to each other and separated by the distance between the second focal point of the condensing optical system 32a and the second focal point of the condensing optical system 32b because of the positional relationship between the condensing optical systems 32a and 32b and the reflecting optical system 33.

The collimator lens 34 is disposed so that the optical axis thereof is situated at the midpoint between the optical axes of the two divergent luminous fluxes from the reflecting optical system 33, and its focal plane includes the condensation positions of the light beams from the light sources 31a and 31b, that is, the second focal points of the condensing optical systems 32a and 32b. Consequently, the light beams from the first and the second light sources 31a and 31b, reflected at the reflecting optical system 33 into divergent luminous fluxes, are both converted into parallel luminous fluxes. The optical axes of the light beams from the first and the second light sources 31a and 31b reflected at the reflecting optical system 33 are close to each other, and the light beams from the first and the second light sources 31a and 31b converted into parallel luminous fluxes overlap in most part. The integrator optical system 35 has a first lens array 41, a second lens array 42 and a superimposing lens 43. The first lens array 41 comprises rectangular lens cells 41c substantially analogous to the liquid crystal panels 39R, 39G and 39B. The lens cells 41c are arranged in a two-dimensional array. The lens cells 41c are arranged in four rows in the direction of the long sides and in five rows in the direction of the short sides. The long sides of the lens cells 41c are parallel to the major axes of the condensing optical systems 32a and 32b, like in the first embodiment. However, since the direction of separation of the second focal points of the condensing optical systems 32a and 32c is vertical to the direction of separation of the second focal points of the condensing optical systems 12a and 12b of the first embodiment, not the long sides but the short sides of the lens cells 41c coincide with the direction of separation of the optical axes of the light beams reflected at the reflecting optical system 33.

In the second lens array 42, rectangular lens cells 42c of a size corresponding to one of two equal parts into which the lens cell 41c of the first lens array 41 is divided in the direction of the long sides are arranged in a two-dimensional array so that adjoining two lens cells 42c correspond to one lens cell 41c. The length of one side of the lens cells 42c equals that of the short sides of the lens cells 41c, and the length of the adjoining sides of the lens cells 42c equals a length being ½ of the long sides of the lens cells 41c.

The lens array 41 is disposed vertically to the optical axis of the collimator lens 34 so that the optical axis of the collimator lens 34 passes through the center of the lens array 41. Since part of the polarization conversion optical system 36, including a right angle prism 44, is situated between the first lens array 41 and the second lens array 42, the lens array 42 is disposed in parallel with the optical axis of the collimator lens 34, and the optical axis of the collimator lens 34 bent by the right angle prism 44 passes through the center. The lens arrays 41 and 42 are disposed so as to be separated by a distance where the focal points of the lens cells 41c of the lens array 41 are situated on the lens cells 42c of the second lens array 42 through the right angle prism 44.

The polarization conversion optical system 36 comprises the right angle prism 44 whose cross section is a right-angled isosceles triangle, half-wave plates 45 and a parallel plate 46. In the right angle prism 44, the orthogonal two surfaces oppose, and are disposed parallel to, the lens arrays 41 and 42. The half-wave plates 45 have a strip form, and are disposed on the right angle prism 44 side surface of the second lens array 42 in the direction of the short sides of the lens cells 41c. The half-wave plates 45 have a width ½ of the length of the long sides of the lens cells 41c, and are each opposed to the one, of the two lens cells 42c corresponding to one lens cell 41, that is closer to the lens array 41.

The parallel plate 46 is made of the same material as the right angle prism 44 and has a thickness ½√2 of the length of the long sides of the lens cells 41c of the first lens array 41. The parallel plate 46 is cemented to the slanting surface of the right angle prism 44. The joint surface 46a of the right angle prism 44 and the parallel plate 46 is a reflecting film to reflect s-polarized light and to transmit p-polarized light. The other surface 46b of the parallel plate 46 is a totally reflecting mirror. Consequently, the right angle prism 44 and the parallel plate 46 functions as a PBS prism.

The parallel luminous fluxes incident on the lens cells 41c of the first lens array 41 of the integrator optical system 35 from the collimator 34 are imaged on the corresponding lens cells 42c of the second lens array 42 to form images of the light sources 31a and 31b. At this time, since the optical axes of the light beams from the light sources 31a and 31b, reflected at the reflecting optical system 33, are separated in the direction of the short sides of the lens cells 41c although being close to each other, the image of the first light source 31a and the image of the second light source 31b on each lens cell 42c of the second lens array 42 are separated in the direction of the short sides of the lens cells 41c.

Of the light having exited from the lens cells 41c, s-polarized light is reflected at the reflecting film 46a and imaged at the ones, closer to the lens array 41, of the two lens cells 42c corresponding to the lens cells 41c. Since the half-wave plates 45 are disposed on the surfaces of incidence of the lens cells, by passing therethrough, the s-polarized light has already been converted into p-polarized light when imaged.

The p-polarized light, having exited from the lens cell 41c, is transmitted by the reflecting film 46a, reflected at the reflecting surface 46b, and imaged at one of two lens cells 42c that is further from the lens array 41 corresponding to the lens cells 41c. Since no half-wave plates are provided on the surfaces of incidence of the lens cells, the image light remains being p-polarized light. Thus, the light beams from the light sources 31a and 31b are converted so as to be all p-polarized light.

Figure 7:
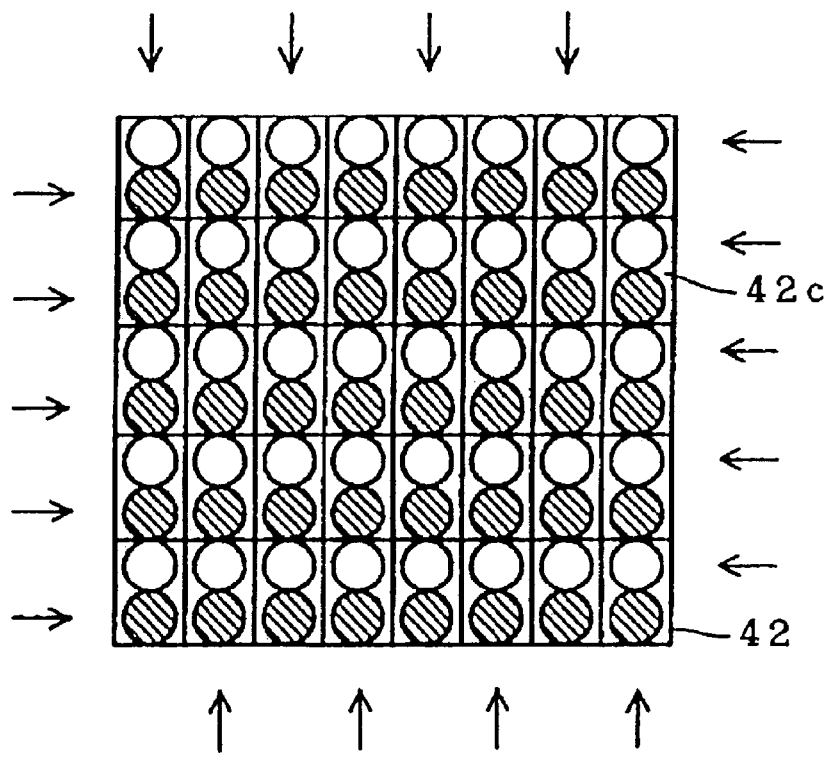
FIG. 7 shows an example of light source images formed on a second lens array of the projective image display apparatus according to the second embodiment.

FIG. 7 shows an example of the light source images formed on the second lens array 42. In FIG. 7, the horizontal direction is the direction corresponding to the long sides of the lens cells 41c. The images in the columns indicated with the right-pointing arrows are the images of the first light source 31a, and the images in the columns indicated with the left-pointing arrows are the images of the second light source 31b. The images in the columns indicated with the down-pointing arrows are the images of the p-polarized light which is originally p-polarized light, and the images in the columns indicated with the up-pointing arrows are the images of the p-polarized light converted from the s-polarized light. The images of the light sources 31a and 31b are alternately formed in the direction of the short sides of the lens cells 41c. The images of the different oscillation directions of polarization are alternately formed in the direction of the long sides of the lens cells 41c.

Thus, on the second lens array 42, light source images four times as many as the lens cells 41c of the first lens array 41 are two-dimensionally formed. The cluster of these images serves as a surface-formed secondary light source for image projection. The light thereof is directed to the liquid crystal panels 39R, 39G and 39B by the superimposing lens 43.

The superimposing lens 43 directs the light having passed through the second lens array 42 to the entire surface of the liquid crystal panels 39R, 39G and 39B from all parts of the second lens array 42. Consequently, to all parts of the liquid crystal panels 39R, 39G and 39B, the light beam having passed through ones of the lens cells 42c that are disposed in the central part and the light beam having passed through ones that are disposed in the peripheral part are supplied, and the light beam from the first light source 31a and the light beam from the second light source 31b are supplied.

Consequently, light of uniform intensity is incident on the liquid crystal panels, so that the brightness of the image projected by the projecting lens 40 is uniform. Moreover, the peripheral parts of the light beams from the first and the second light sources 31a and 31b are also incident on the liquid crystal panels 39R, 39G and 39B, so that the light use efficiency in image projection improves. In addition, since the s-polarized light is converted into p-polarized light, which the liquid crystal panels modulate, the light use efficiency further improves. The superimposing lens 43 may be omitted by providing the second lens array 42 with the function of the superimposing lens 43.

The dichroic mirrors 51R and 51B and the totally reflecting mirrors 52a, 52b and 52c are all disposed so as to be inclined at 45 degrees with respect to the optical axes of the incident light. The relay lenses 53a and 53b, the field lenses 37R, 37G and 37G, the polarizing plates 38R, 38G and 38B and the liquid crystal panels 39R, 39G and 39B are disposed vertically relative to the optical axis of the incident light. The dichroic mirror 51R transmits the light beam of R and reflects the light beams of the other colors. The dichroic mirror 51B transmits the light beam of B and reflects the light beams of the other colors.

The distances between adjoining dichroic mirrors 51R and 51B and the totally reflecting mirrors 52a, 52b and 52c are all the same. The optical path lengths from the dichroic mirror 51R to the field lenses 37R and 37G are the same. The relay lenses 53a and 53b are provided for correcting the difference between the optical path length from the dichroic mirror 51R to the field lens 37B and the optical path length from the dichroic mirror 51R to the field lenses 37R and 37G.

The field lenses 37R, 37G and 37B and the polarizing plates 38R, 39G and 39B are the same as the field lens 17 and the polarizing plate 18 of the first embodiment. The liquid crystal panels 39R, 39G and 39B are driven by separately-provided non-illustrated drive circuits. The drive circuits are supplied with R signals representative of R components of images, G signals representative of G components and B signals representative of B components, respectively.

The cross dichroic prism 54 comprises four right angle prisms cemented together. On the joint surfaces, a reflecting film 54R reflecting the light beam of R and transmitting the light beams of the other colors and a reflecting film 54B reflecting the light beam of B and transmitting the light beam of the other colors are provided. The reflecting film 54R and the reflecting film 54B are orthogonal to each other, and are disposed so as to be inclined at 45 degrees with respect to the liquid crystal panels 39R, 39G and 39B.

The light beams of the light source images on the second lens array 42 of the integrator optical system 35 are transmitted by the superimposing lens 43 and incident on the dichroic mirror 51R. Of the light beams incident on the dichroic mirror 51R, the light beam of R is transmitted by the mirror 51R, reflected at the totally reflecting mirror 52a, passed through the field lens 37R and the polarizing plate 38R, and is then incident on the liquid crystal panel 39R. Of the light beams incident on the dichroic mirror 51R, the light beam of G and the light beam of B are reflected at the mirror 51R and incident on the dichroic mirror 51B.

Of the light beams incident on the dichroic mirror 51B, the light beam of G is reflected at the mirror 51B, passed through the field lens 37G and the polarizing plate 38G, and is then incident on the liquid crystal panel 39G. Of the light beams incident on the dichroic mirror 51B, the light beam of B is transmitted by the mirror 51B, passed through the relay lens 53a, is reflected at the totally reflecting mirror 52b, passed through the relay lens 53b, is reflected at the totally reflecting mirror 52b, passed through the relay lens 53b, is reflected at the totally reflecting mirror 52c, passed through the field lens 37B and the polarizing plate 38B, and is then incident on the liquid crystal panel 39B.

The light beam of R, the light beam of G and the light beam of B incident on the liquid crystal panels 39R, 39G and 39B are modulated in accordance with the corresponding image signals, transmitted by the liquid crystal panels 39R, 39G and 39B, and incident on the cross dichroic prism 54. The light beam of R and the light beam of B incident on the cross dichroic prism 54 are reflected at the reflecting films 54R and 54B toward the projecting lens 40. The light beam of G incident on the cross dichroic prism 54 is incident on the projecting lens 40 as it is.

Thus, the light beams of the three colors are synthesized and projected onto the screen by the projecting lens 40. Consequently, a color image is displayed on the screen. The projecting lens 40 has a focusing mechanism and a zooming mechanism, and the projection distance and the projection magnification thereof are variable. Since the field lenses 37R, 37G and 37B convert the light beams into light beams substantially vertical to the liquid crystal panels 39R, 39G and 39B, the loss of light due to the angle dependency of the liquid crystal panels and the cross dichroic prism 54 is prevented, so that substantially all of the light beams are directed to the projecting lens 40.

Setting conditions of the optical systems of the projective display apparatus 2 for displaying bright images by using as much of the light beams from the light sources 11a and 11b as possible for projection resemble the conditions of the first embodiment. The difference is that in the projective display apparatus 1, the lens cells 21c of the first lens array 21 of the integrator optical system 15 separate the light beams from the light sources 11a and 11b in the direction of the long sides of the lens cells 21c, and the polarization conversion optical system 16 separates the polarized light in the direction of the short sides of the lens cells 21c; whereas, in the projective display apparatus 2, the lens cells 41c of the first lens array 41 of the integrator optical system 35 separate the light beams from the light sources 31a and 31b in the direction of the short sides of the lens cells 41c and the polarization conversion optical system 36 separates the polarized light in the direction of the long sides of the lens cells 41c. The optical systems such as the dichroic mirror 51R disposed between the superimposing lens 43 and the field lenses 37R, 37G and 37B are irrelevant to the light use efficiency.

Parameters of the optical systems of this embodiment are defined as follows:

CH is the length of the short sides of the lens cells 41c;

CW is the length of the long sides of the lens cells 41C;

PH is the length of the short sides of the liquid crystal panels 39R, 39G and 39B;

PW is the length of the long sides of the liquid crystal panels 39R, 39G and 39B;

L1 is the optical path length between the first lens array 41 and the second lens array 42;

L2 is the optical path length between the second lens array 42 and the field lenses 37R and 37G;

fc is the focal length of the collimator lens 34;

d is ½ of the distance between the first condensation position of the first condensing optical system 32a and the second condensation position of the second condensing optical system 32b; and M is ½ of the luminous flux diameters, at the first and the second condensation positions, of the light beam from the first light source 31a and the light beam from the second light source 31b.

The condition for directing all of the light beams incident on the first lens array 41 of the integrator optical system 35 to the entire surfaces of the liquid crystal panels 39R, 39G and 39B is the above-described expression (1). The condition for making all of the light beams from the light sources 31a and 31b incident on the integrator optical system 35 is the above-described expression (2).

Figure 8:
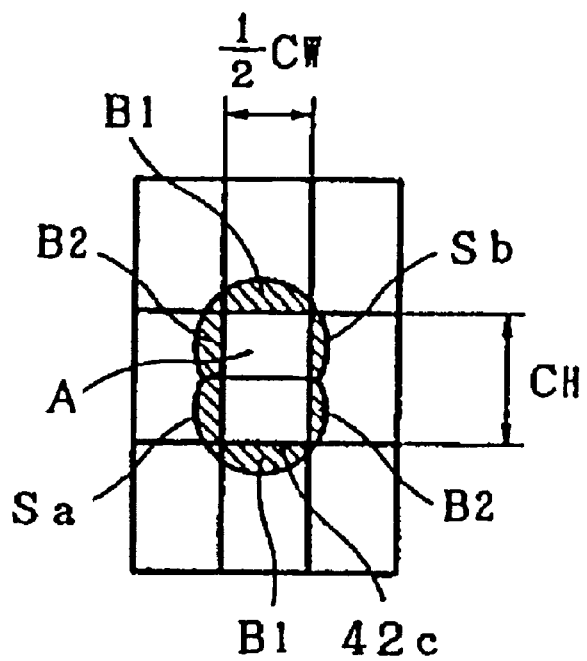
FIG. 8 shows an example of light source images on one lens cell of the second lens array of the projective image display apparatus according to the second embodiment.

Conditions for the lens cells 41c of the first lens array 41 to image as much of the incident light beams as possible in the corresponding lens cells 42 of the second lens array 42 will be described with reference to FIG. 8. FIG. 8 shows an image formed of light beams which are originally p-polarized light, of the light sources 31a and 31b formed on one of the two lens cells 42c corresponding to one lens cell 41c. The light source image formed of the light beams converted from s-polarized light into p-polarized light, formed on the other lens cell 42 are the same as those shown in the figure. In FIG. 8, the horizontal direction corresponds to the direction of the long sides of the lens cells 41c of the first lens array 41, and the vertical direction corresponds to the direction of the short sides thereof.

An image Sa of the first light source 31a and an image Sb of the second light source 31b are formed on the lens cell 42c symmetrically in the direction of the short sides of the lens cells 41c. A line, in the direction of the long sides, in the center with respect to the direction of the short sides of the lens cells 41c, that is, the axis of symmetry of the light source images Sa and Sb, corresponds to the boundary line between the reflecting surface 33a and the reflecting surface 33b of the reflecting optical system 33. As described below, the part of the light source images Sa and Sb whose light is used for image projection is an unhatched rectangular part A in the central part. The light of hatched parts B1 and B2 around the part A cannot be used for image projection.

Since the focal length of the collimator lens 34 is fc and the focal length of the lens cell 41c of the first lens array 41 is L1, the enlargement magnification at the second lens array 42 to the first and the second condensation positions is L1/fc. Therefore, the distances from the axis of symmetry to the centers of the light source images Sa and Sb are d·L1/Fc and the radii of the light source images Sa and Sb are M·L1/fc.

In the example of FIG. 8, the expression (2) is not satisfied so that part of the light from the light sources 31a and 31b is not reflected at the reflecting optical system 13, and part of each of the light source images Sa and Sb, which are intrinsically circular, is missing at the axis of symmetry. Moreover, in this example, the light of another part B1 of each of the light source images Sa and Sb is incident on the lens cell adjoining in the direction of the short sides of the lens cells 41c. The light of the part B1 is incident on the superimposing lens 43 at an inappropriate angle, so that it does not exit toward the liquid crystal panels 39R, 39G and 39B.

To prevent the loss of light caused by the incidence of the light of the light source images Sa and Sb on the lens cells adjoining in the direction of the short sides of the lens cells 41c, it is necessary that the following condition hold:

$$d \cdot L1/fc + M \cdot L1/fc \leq (\frac{1}{2}) \cdot CH \tag{8}$$

Since at the polarization conversion optical system 36, p-polarized light and s-polarized light are separated in the direction of the long sides of the lens cells 41c and the half-wave plates 45 are disposed so as to be opposed to the adjoining lens cells situated on the right-hand side and the left-hand side of the lens cell 42c shown in the figure, of the light of the light source images Sa and Sb, the light of the parts B2 on the adjoining lens cells is s-polarized light that is not used. Therefore, in order to convert all the light into desired p-polarized light and use it for image projection, the diameters of the light source images Sa and Sb on the lens cell 42c must be half the length of the long sides of the lens cells 41c or smaller. The condition therefor is as follows:

$$M \cdot L1/fc \leq (\frac{1}{4}) \cdot C \tag{9}$$

The polarization conversion efficiency at this time is a theoretical maximum value 2.

When the expressions (1), (2), (8) and (9) are all satisfied, the light beams emitted by the two light sources 31a and 31b, and converged by the condensing optical systems 32a and 32b, are all directed to the integrator optical system 35, and supplied from the integrator optical system 35 to the liquid crystal panels without any loss with the s-polarized light being all converted into p-polarized light by the polarization conversion optical system 36. The light source images in FIG. 7 show this ideal condition. At this time, the quantity of light used for image projection is four times that in the case where light from one light source is converged and directed to the liquid crystal panels 39R, 39G, 39B as it is. In addition, since the intensity distribution of the light is harmonized by the integrator optical system 35, it is unnecessary to discard the peripheral part of the luminous flux as shown in FIG. 13(b), so that the light use efficiency further improves.

However, for the reason mentioned in the first embodiment, satisfaction of the expressions (1), (2), (8) and (9), which are ideal conditions with respect to the brightness of the displayed image, is not always advisable in other points. Therefore, the projective display apparatus 2 satisfies the following expressions (10) and (11), of less strict limitations, and the above-described expression (5) while considering the meanings of the expressions (1), (2), (8) and (9):

$$(\frac{1}{8}) \cdot CH \leq d \cdot L1/fc \leq (\frac{3}{8}) \cdot CH \tag{10}$$

$$M \cdot L1/fc \leq (\frac{1}{2}) \cdot CW \tag{11}$$

The expression (5) ensures that the liquid crystal panels 39R, 39G and 39B fall within the luminous flux of the integrator optical system 35. The expression (10) permits the light source images Sa and Sb on the lens cells 42c to slightly extend into the lens cells adjoining in the direction of the short sides of the lens cells 41c. When d·L1/fc=(¼)·CH, the centers of the first and the second light source images Sa and Sb on the lens cells 42c of the second lens array 42 are separated by ½ of the length of the short sides of the lens cells 41c, and the areas of the light source images Sa and Sb that lie on the lens cells 42c are maximum irrespective of the sizes of the light source images Sa and Sb.

The expression (11) permits the light source images Sa and Sb that should be within the lens cells 42c to extend into the lens cells adjoining in the direction of the long sides of the lens cells 41c. Even when the equal sign holds, only the circumferences of the outer rims of the light source images Sa and Sb reach the centers of the adjoining lens cells, and of the light source images Sa and Sb, the parts that lie on the lens cells 42c are larger than the parts that extend into the adjoining lens cells. Consequently, the polarization conversion efficiency exceeds 1 and the effect of polarization conversion is ensured.

In this embodiment, it is desirable that the angle of radiation of the condensing optical systems 32a and 32b be approximately 110 to 130 degrees. Moreover, condensing optical systems of a different type may be used.

While the projective display apparatus 1 of the first embodiment is not for displaying color images, color images are easily displayed by arranging the superimposing lens 23 and the succeeding optical systems like those in the second embodiment. By using a liquid crystal panel that has for each pixel a color filter selectively transmitting one of the light beams of R, G and B as the liquid crystal panel 19, color images can also be displayed.

While the polarization conversion is performed by the PBS array method in the first embodiment and by the PBS prism method in the second embodiment, the polarization conversion method does not depend on the direction in which the light beams from the two light sources are separated. In either of these methods, it is necessary only that the polarization separation direction for the polarization conversion be vertical to the separation direction of the light beams from the light sources.

In the projective image display apparatuses 1 and 2 of the first and the second embodiments, the object of the present invention of displaying images of high and uniform brightness by use of two light sources and using light beams from the light sources without any waste is sufficiently achieved. In practical use, it is not always required to display bright images; it is preferable that the brightness of the displayed images can be switched according to the ambient brightness. The switching of the image brightness can be made by turning on both of the light sources or one of the light sources.

Figure 13A:
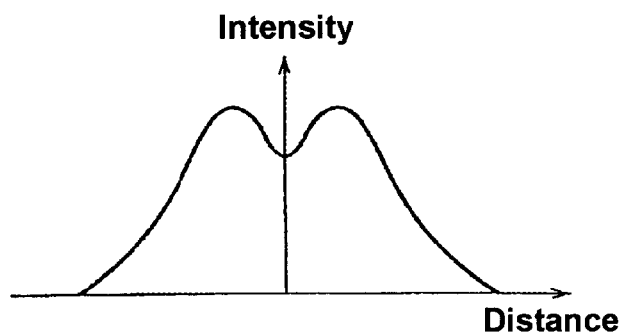
FIGS. 13(a) and 13(b) respectively show the intensity distribution of light supplied to a liquid crystal panel and a range of luminous flux used by such a liquid crystal panel in a conventional projective image display apparatus.
Figure 13B:
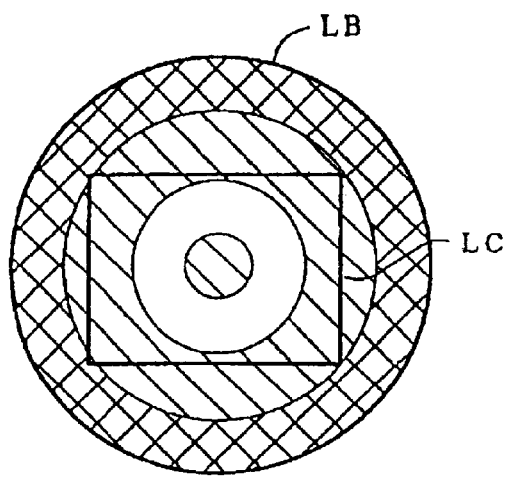

In the projective display apparatuses 1 and 2, the optical axes of the light beam from the first light source and the light beam from the second light source are made parallel by the reflecting optical system. Consequently, when only one of the light sources is turned on, the intensity of the light directed to the liquid crystal panel is slightly nonuniform for the following reasons:

The intensity distribution of the light beams from the light sources converged by the condensing optical systems is nonuniform, as shown in FIG. 13(a), and light beams of the nonuniform intensity distribution are incident on a first lens array 21 of the integrator optical system. Moreover, the first lens array 21 is set so that the center thereof is situated at the midpoint between the parallel optical axes of the light beams from the first and the second light sources. Consequently, the intensity distribution of the light beam from the first light source on the first lens array is asymmetrical with respect to the center of the first lens array in the direction of separation of the optical axes of the light beams from the first and the second light sources, and the intensity distribution of the light beam from the second light source is similarly asymmetrical.

To the lens cells of the second lens array, the light beams from the corresponding lens cells of the first lens array are directed, and when the light intensity distribution on the first lens array is asymmetrical, the light intensity distribution on the second lens array is also asymmetrical. That is, the brightness of the light source images on the two lens cells situated at the same distance from the center of the second lens array in the direction of separation of the optical axes is not symmetrical. Although the light beams from the lens cells of the second lens array are superimposed one on another on the liquid crystal panel, since the brightness of the light source images on the second lens array is systematically asymmetrical, the intensity of the light directed to the liquid crystal panel is also not symmetrical in the direction of separation of the optical axes.

When the intensity of the light directed to the liquid crystal panel is nonuniform, the brightness of the displayed image is also nonuniform. However, even when this happens, the brightness is not clearly recognized as having a lack of uniformity because the brightness gradually varies from one end to the other end of an image. However, in the arrangement in which light is separated into light beams of the three colors and one of them is directed to a liquid crystal panel by a relay lens, for example, like in the projective display apparatus 2 of the second embodiment, the intensity distribution of the one light beam is opposite to those of the other two light beam, which is sometimes recognized as color nonuniformness. In the example of the projective display apparatus 2 in which the light beam of B is directed by the relay lens, there are areas where blue components are enhanced and where they are weak.

Hereinafter, projective image display apparatuses 3 and 4 according to third and fourth embodiments will be described that are capable of directing light of uniform intensity to the liquid crystal panel even when only one of the first and the second light sources is turned on.

Figure 9:
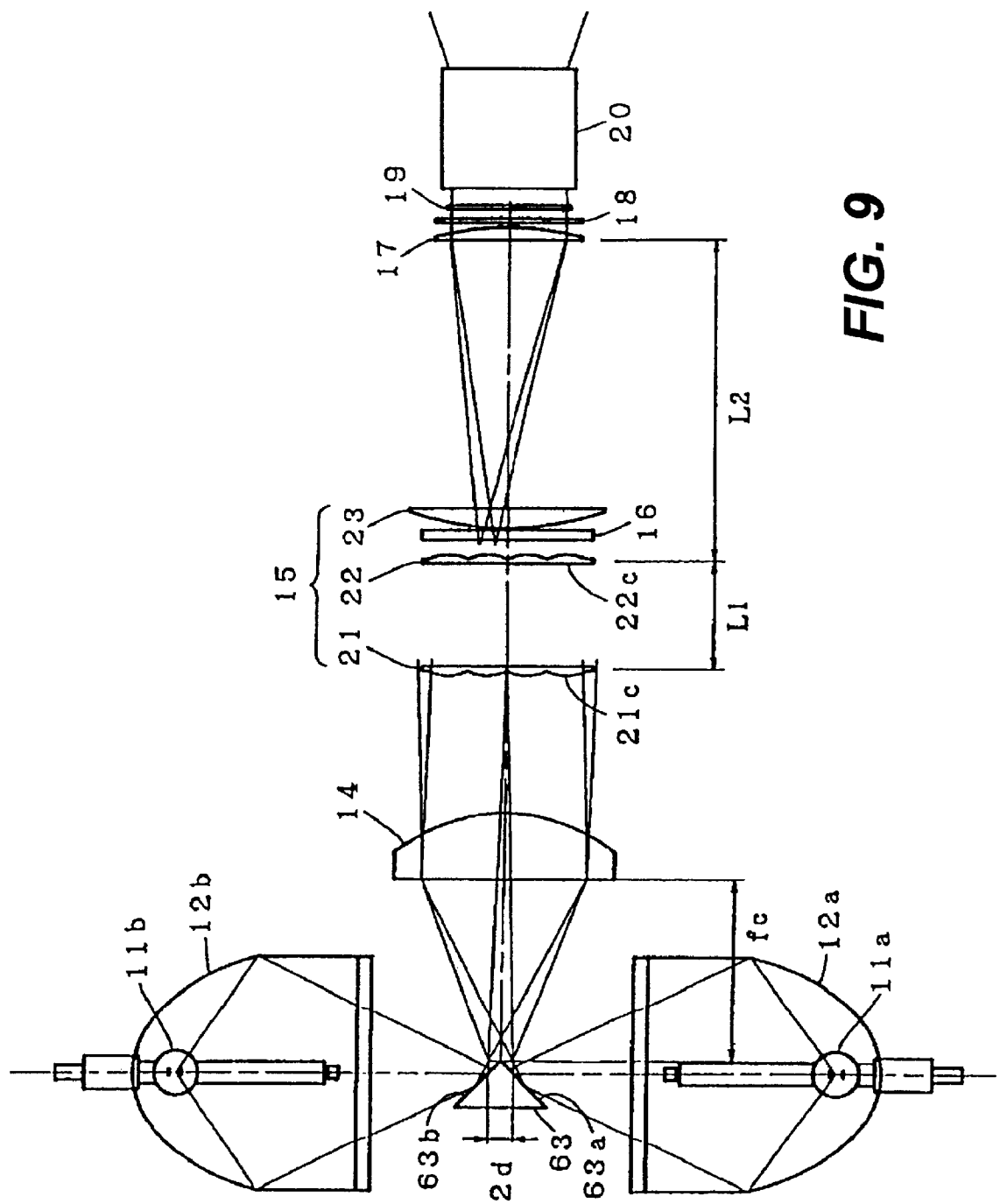
FIG. 9 shows the general structure of optical systems of a projective image display apparatus according to a third embodiment.

FIG. 9 shows the structure of optical systems of the projective image display apparatus 3 according to the third embodiment. The projective display apparatus 3 has a reflecting optical system 63 instead of the reflecting optical system 13 of the projective display apparatus 1 of the first embodiment. Except this, the structure of the projective display apparatus 3 is the same as that of the projective display apparatus 1.

The reflecting optical system 63 has, as reflecting surfaces, two surfaces 63a and 63b of a triangular prism whose cross section is an isosceles triangle. However, unlike the reflecting optical system 13, the angle between the reflecting surfaces 63a and 63b is slightly larger than 90 degrees. The positional relationship of the reflecting optical system 63 with the first and the second condensing optical systems 12a and 12b is the same as that in the projective display apparatus 1. The reflecting optical system 63 reflects the light beam from the first light source 11a at the condensation position thereof with the reflecting surface 63a and reflects the light beam from the second light source 11b at the condensation position thereof with the reflecting surface 63b. The light beams from the light sources 11a and 11b after reflection are divergent luminous fluxes.

The angle between the reflecting surfaces 63a and 63b is set so that after reflection the optical axis of the light beam from the first light source 11a and the optical axis of the light beam from the second light source 11b pass through the center of the first lens array 21 of the integrator optical system 15. That is, in the projective display apparatus 3 of this embodiment, the optical axes of the light beams from the light sources 11a and 11b reflected at the reflecting optical system 63 are not made parallel although close to parallel, and made to intersect on the first lens array 21.

The light beam from the first light source 11a and the light beam from the second light source 11b directed from the lens cells 21c of the first lens array 21 to the second lens array 22 are separated on the lens cells 22c of the second lens array 22 because of an angle difference between the optical axes of the light beams. Consequently, two images of the light sources 11a and 11b are formed on each lens cell 22c like in the projective display apparatus 1.

The intensity distribution of the light beam from the first light source 11a on the first lens array 21 is symmetrical with respect to the center of the lens array 21 because the optical axis thereof passes through the center of the lens array 21. The intensity distribution of the light beam from the second light source 11b on the first lens array 21 is also symmetrical with respect to the center of the lens array 21 because the optical axis thereof passes through the center of the lens array 21.

Consequently, not only when both of the light sources 11a and 11b are turned on but also when only one of them is turned on, the brightness of the light source images formed on the second lens array 22 is symmetrical between the lens cells 22c, so that the integrator optical system 15 can supply light of uniform intensity to the liquid crystal panel 19. That is, the brightness of the images displayed by the projective display apparatus 3 is always uniform.

When half the distance between the two intersections of the major axes of the condensing optical systems 12a and 12b and the reflecting surfaces 63a and 63b, that is, half the distance between the first condensation position of the light beam from the first light source 11a and the second condensation position of the light beam from the second light source 11b is d, the relationship among the distance d, the length CW of the long sides of the lens cells 21c of the first lens array 21, the focal length fc of the collimator lens 14 and the optical path length L1 between the first lens array 21 and the second lens array 22 satisfies the expression (6). The other parameters satisfy the expressions (5) and (7). Consequently, the projective display apparatus 3 efficiently uses the light beams from the light sources 11a and 11b for image projection.

While the reflecting optical system 63 in which the angle between the reflecting surfaces 63a and 63b is an obtuse angle is used in this embodiment, a reflecting optical system 13 having orthogonal reflecting surfaces may be used. In that case, the angles of the condensing optical systems 12a and 12b to the reflecting surfaces 13a and 13b are changed so that the optical axes of the light beams from the light sources 11a and 11b intersect on the lens array 21.

Figure 10:
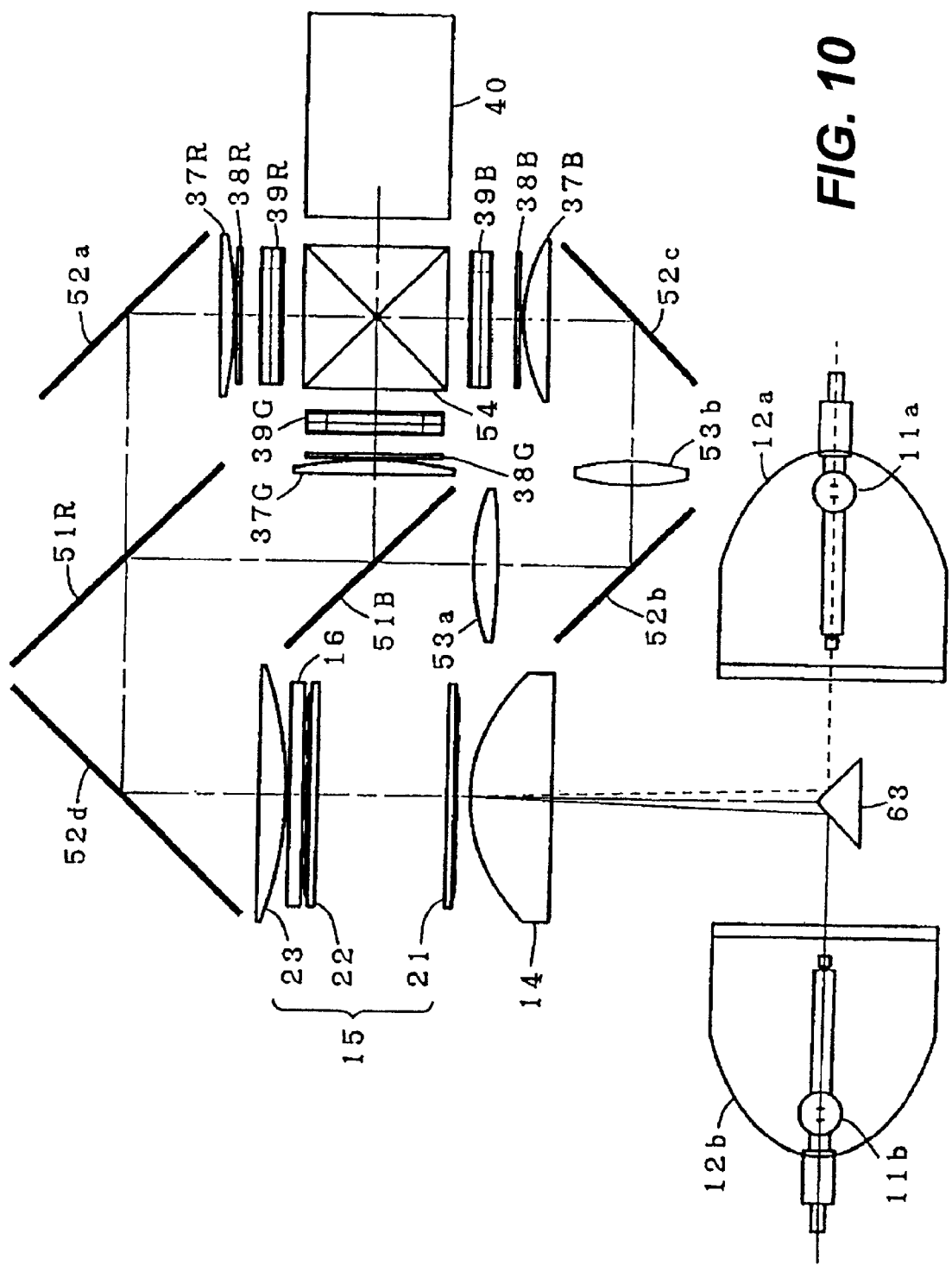
FIG. 10 shows the general structure of optical systems of a projective image display apparatus according to a fourth embodiment.

FIG. 10 shows the structure of optical systems of a projective image display apparatus 4 according to a fourth embodiment. The projective display apparatus 4 is a combination of the arrangement from the light sources 11a and 11b to the integrator optical system 15 of the projective display apparatus 3 of the third embodiment and the arrangement from the dichroic mirror 51R to the projecting lens 40 of the projective display apparatus 2 of the second embodiment. A totally reflecting mirror 52d is disposed between the integrator optical system 15 and the dichroic mirror 51R so that the overall size of the apparatus is small.

As described above, the integrator optical system 15 can supply light of uniform intensity to the liquid crystal panels 39R, 39G and 39B even when only one of the light sources 11a and 11b is turned on. Consequently, the intensity distributions of the light beams of R, G and B after color separation are all symmetrical, and even if the light beam of B is reversed by the relay lens 53b on the way, the intensity distribution thereof does not change. For this reason, there is no intensity difference between the light beam of B directed to the liquid crystal panel 39B through the relay lenses 53a and 53b and the light beams of R and G directed to the liquid crystal panels 39R and 39G, which does not pass through a relay lens, so that images without any color nonuniformness can always be displayed.

In the projective display apparatus 4, the parameters also satisfy the relationships of the expressions (5), (6) and (7), and the light beams from the light sources 11a and 11b are efficiently used for image projection.

While in the above-described embodiments, a reflecting optical system having two reflecting surfaces is used to superimpose light beams from first and second light sources and to direct the superimposed light beams to a collimator lens and the light beams from the first and the second light sources are both reflected, a reflecting optical system reflecting only light beams from one of the light sources can be used.

Figure 11:
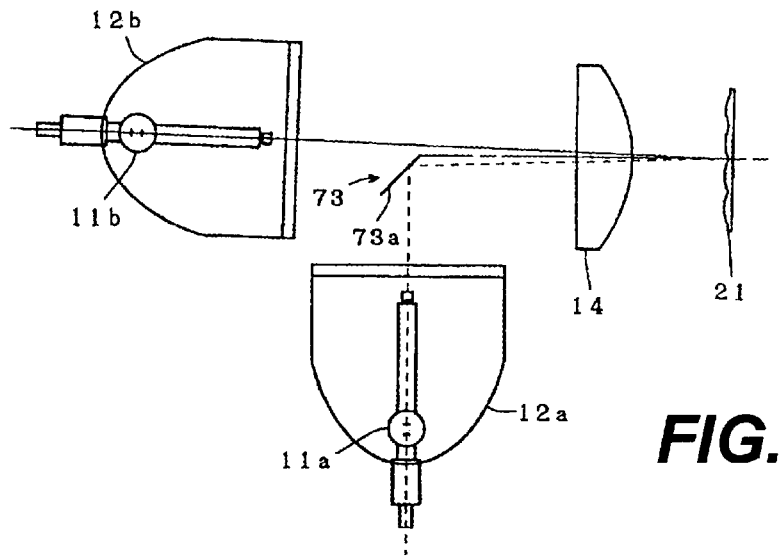
FIG. 11 shows the structure of part of optical systems of a projective image display apparatus according to a fifth embodiment.

FIG. 11 shows the structure of optical systems from the light sources to the first lens array of an integrator optical system in a projective image display apparatus 5 according to a fifth embodiment having such a reflecting optical system. The projective display apparatus 5 is the projective display apparatus 3 of the third embodiment that has as a reflecting optical system 73—a plane mirror having only a reflecting surface 73a. The reflecting surface 73a is equivalent to the reflecting surface 13a of the reflecting optical system 13, and the positional relationship between the reflecting surface 73a and the first condensing optical system 12a is the same as that in the projective display apparatus 3. The condensation position of the second condensing optical system 12b is close to the condensation position of the first condensing optical system 12a, whereas the major axis of the second condensing optical system 12b is disposed so as to directly pass through the center of the first lens array 21 and does not intersect the reflecting surface 73a.

The light beam from the first light source 11a is reflected at the reflecting surface 73a, and the light beam from the second light source 11b passes in a straight line by the side of the reflecting surface 73a. The light beams from the first and the second light sources 11a and 11b, having respectively passed through the condensation positions on the reflecting surface 73 and close to the reflecting surface 73a, are divergent luminous fluxes, incident on the collimator lens 14, being superimposed on one another, and converted into parallel luminous fluxes.

As described above, according to the projective image display apparatuses of the embodiments, by providing two light sources and providing the polarization conversion optical system to convert the light beams into linearly polarized light of one direction, the quantity of light used for image projection increases, so that bright images can be displayed, and by providing the integrator optical system to uniformize, or harmonize, the light intensity distribution, images without any brightness nonuniformness can be displayed. In addition, since the direction of separation of the light beams from the light sources by the integrator optical system and the direction of separation of the polarized light by the polarization conversion optical system are vertical to each other, polarization conversion is ensured and the brightness is harmonized, so that there is no possibility that improvement of the brightness is difficult to achieve. Further, since most of the light directed to the liquid crystal panel is linearly polarized light of one direction and the polarized light component of different oscillation direction is small, the burden on the polarizing plate disposed on the light incident side of the liquid crystal panel is reduced, so that it is unnecessary to provide a high-performance polarizing plate.

In the arrangement in which the optical axes of the light beams from the two light sources intersect each other on the first lens array, even when one of the light sources is not turned on or when the light emission amounts of the two light sources are different, images of uniform brightness can be displayed. Moreover, in the arrangement in which the light from the integrator optical system is color-separated and one of the separated color light beams is directed to the liquid crystal panel through the relay lens, no color nonuniformness is caused in the displayed images.

In the arrangement in which the lens cells of the first lens array of the integrator optical system are rectangular and arranged in the direction of the long sides of the lens cells so that the light beams from the first and the second light sources are separated, and the relationships of the expressions (5), (6) and (7) are satisfied, most of the light from the light sources can be supplied to the liquid crystal panel and much of the light supplied to the liquid crystal panel can be converted into linearly polarized light of one direction. Consequently, light use efficiency in image projection improves, so that images can be displayed having uniform brightness and being surely brighter than those in the arrangement using the light beam from one light source for image projection as it is. The conditions can be optimized within the ranges of the expressions. When this is done, all of the light beams from the two light sources can be used for image projection, so that the brightness of the displayed images is maximum.

This applies to the arrangement in which the lens cells of the first lens array are arranged so that the light beams from the first and the second light sources are separated in the direction of the short sides thereof and the expressions (5), (10) and (11) are satisfied.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A projective image display apparatus that modulates light with a display panel and projects modulated light with a projecting lens to display an image, the apparatus comprising:

a first light source to emit a light beam;

a second light source to emit a light beam;

an integrator optical system, having a first lens array and a second lens array, to effect, through use of the first lens array, an imaging of light beams emitted from the first light source and the second light source on the second lens array, and to effect an illumination of an entire surface of the display panel, wherein the first lens array receives light beams emitted from the first light source and the second light source; and a polarization conversion optical system, positioned subsequent to the first lens array, to separate received light beams, which passed through the first lens array, based on an oscillation direction of the light beams and to convert a first oscillation direction of at least a portion of the received light beams to a second oscillation direction.

2. A projective image display apparatus in accordance with claim 1, further comprising:

a first condensing optical system to converge a light beam from the first light source at a first condensation position; and a second condensing optical system to converge a light beam from the second light source at a second condensation position, wherein the second condensation position is proximate to the first condensation position.

3. A projective image display apparatus in accordance with claim 1, further comprising a collimator lens to receive light beams emitted from the first light source and the second light source and to convert received light beams into parallel luminous fluxes.

4. A projective image display apparatus in accordance with claim 3, wherein the collimator lens is positioned prior to the first lens array.

5. A projective image display apparatus in accordance with claim 1, wherein the first light source is axially aligned with the first lens array so that a beam emitted from the first light source is axially aligned with the first light array.

6. A projective image display apparatus in accordance with claim 1, further comprising a reflecting optical system having at least one reflecting surface that receives at least one light beam from the first light source and the second light source to reflect the at least one light beam to the integrator optical system.

7. A projective image display apparatus in accordance with claim 6, wherein the reflecting optical system reflects light beams received from the first light source and the second light source so that optical axes such light beams are at least approximately parallel.

8. A projective image display apparatus in accordance with claim 6, wherein the reflecting optical system includes two reflecting surfaces, and an angle between the reflecting surfaces is greater than 90°.

9. A projective image display apparatus in accordance with claim 6, wherein the reflecting optical system includes a first reflecting mirror and a second reflecting mirror, the first reflecting mirror being orthogonally arranged with respect to the second reflecting mirror, and a longitudinal axis of the first reflecting mirror is displaced a prescribed distance from a longitudinal axis of the second reflecting mirror.

10. A projective image display apparatus in accordance with claim 1, further comprising:

a plurality of display panels, including the display panel; and a color separation optical system, positioned subsequent to the polarization conversion optical system and prior to the plurality of display panels, to separate light beams emitted from the first light source and the second light source into color components, wherein individual color components are incident on respective display panels of the plurality of display panels.

11. A projective image display apparatus that modulates light with at least one display panel and projects modulated light with a projecting lens to display an image, the apparatus comprising:

a first light source to emit a light beam;

a second light source to emit a light beam;

a first condensing optical system to converge a light beam from the first light source at a first condensation position;

a second condensing optical system to converge a light beam from the second light source at a second condensation position, wherein the second condensation position is proximate to the first condensation position;

a reflecting optical system having at least one reflecting surface, which receives at least one of the light beams from the first and second light sources, to reflect any received light beam;

a collimator lens to receive light beams emitted from the first light source and the second light source and to convert such light beams into parallel luminous fluxes;

an integrator optical system, having a first lens array and a second lens array, to effect, through use of the first lens array, an imaging of luminous fluxes on the second lens array, and to effect an illumination of an entire surface of the at least one display panel; and a polarization conversion optical system, positioned subsequent to one of the first lens array and the second lens array, to separate luminous fluxes, which pass through the first lens array, based on an oscillation direction of the luminous fluxes, and to convert a first oscillation direction of at least a portion of the luminous fluxes to a second oscillation direction.

12. A projective image display apparatus in accordance with claim 11, wherein the first lens array includes lens cells arranged in a two-dimensional array, and the second lens array includes lens cells arranged in a two-dimensional array in correspondence with the lens cells of the first lens array.

13. A projective image display apparatus in accordance with claim 12, further comprising a field lens positioned before the at least one display panel, wherein the apparatus satisfies the following condition:

$$PH/CH \approx PW/CW \leq L2/L1$$

wherein,

PH is a length of a short side of the at least one display panel,

CH is a length of a short side of each lens cell of the first lens array,

PW is a length of a long side of the at least one display panel,

CW is a length of a long side of each lens cell of the first lens array,

L1 is an optical path length between the first lens array and the second lens array, and L2 is an optical path length between the second lens array and the field lens.

14. A projective image display apparatus in accordance with claim 13, wherein the apparatus satisfies the following conditions:

$$(1/8) \cdot CW \leq d \cdot L1/fc \leq (3/8) \cdot CW$$

$$M \cdot L1/fc \leq (1/2) \cdot CH$$

where, d is ½ of a distance between the first condensation position and the second condensation position, fc is a focal length of the collimator lens, and M is ½ a luminous flux diameter at the first condensation position.

15. A projective image display apparatus in accordance with claim 13, wherein the apparatus satisfies the following conditions:

$$(1/8) \cdot CH \leq d \cdot L1/fc \leq (3/8) \cdot CH$$

$$M \cdot L1/fc \leq (1/2) \cdot CW$$

where, d is ½ of a distance between the first condensation position and the second condensation position, fc is a focal length of the collimator lens, and M is ½ a luminous flux diameter at the first condensation position.

16. A projective image display apparatus in accordance with claim 11, wherein the reflecting optical system includes two reflecting surfaces, and an angle between the reflecting surfaces is greater than 90°.

17. A projective image display apparatus in accordance with claim 11, wherein the reflecting optical system includes a first reflecting mirror and a second reflecting mirror, the first reflecting mirror being orthogonally arranged with respect to the second reflecting mirror, and a longitudinal axis of the first reflecting mirror is displaced a prescribed distance from a longitudianl axis of the second reflecting mirror.

18. A projective image display apparatus in accordance with claim 11, further comprising:

a plurality of display panels, including the at least one display panel; and a color separation optical system, positioned optically downstream from the polarization conversion optical system and prior to the plurality of display panels, to separate the light beams into color components, wherein individual color components are incident on respective display panels of the plurality of display panels.

19. A projective image display apparatus in accordance with claim 11, wherein the first light source is axially aligned with the first lens array so that a beam emitted from the first light source is axially aligned with the first light array.

20. A projective image display apparatus in accordance with claim 11, wherein the polarization conversion optical system is adapted to convert an oscillation direction of luminous fluxes received from a central portion of the second lens array.

* * * * *